United States Patent
Hutton

[15] 3,669,267
[45] June 13, 1972

[54] FILTER PRESS PLATE PROCESS AND APPARATUS

[72] Inventor: William L. Hutton, East Hampton, N.Y.
[73] Assignee: T. Shriver & Company, Inc., Harrison, N.J.
[22] Filed: July 7, 1970
[21] Appl. No.: 52,798

[52] U.S. Cl. ............................................. 210/75, 210/231
[51] Int. Cl. ............................................. B01d 37/02
[58] Field of Search ........................... 210/225–231, 67, 210/74, 75, 82, 84, 130

[56] References Cited

UNITED STATES PATENTS

| 1,488,862 | 4/1924 | Burchenal | 210/228 |
| 3,577,339 | 5/1971 | Baird, Jr. et al. | 210/75 |
| 2,971,648 | 2/1961 | Lane et al. | 210/75 |
| 3,019,184 | 1/1962 | Brown | 210/82 |
| 3,202,284 | 8/1965 | Wade | 210/75 |

Primary Examiner—Reuben Friedman
Assistant Examiner—T. A. Granger
Attorney—Curtis, Morris & Safford

[57] ABSTRACT

Process and apparatus for chamber-type filter presses formed with a plurality of filter plates, each having a peripheral frame and an integral partition plate dividing the frame into filter cake receiving recesses with filter cloths within the recesses and pressed into grooves on the interior periphery of the filter plate by caulking strips to retain the cloths against the surface of the plates; the plates have a first inlet port extending through the frame on one edge thereof radially outwardly of the filter cloth for communication with a corresponding inlet in adjacent filter plates, a second inlet port extending through the frame on a side thereof opposite the first inlet port for communicating with a corresponding inlet in the adjacent filter plates, both of the inlets communicate, outwardly of the filter cloths, with the recesses formed in the filter plates, and at least one outlet port on each side of the partition plate for discharging fluid flowing through the filter cloths from the filter plate. The filter press is utilized in a process for filtering fluid containing solid substances suspended therein which is initially supplied under pressure to the lower of the inlet ports and flows along the surfaces of the filter cloths towards the upper of the inlet ports whereby the fluid is recirculated and distributed through the upper ports until the press is filled with fluid, and thereafter the fluid to be filtered is supplied to both the lower and upper ports to maintain an even distribution of pressure in the press while filtered effluent is continuously drained therefrom.

15 Claims, 3 Drawing Figures

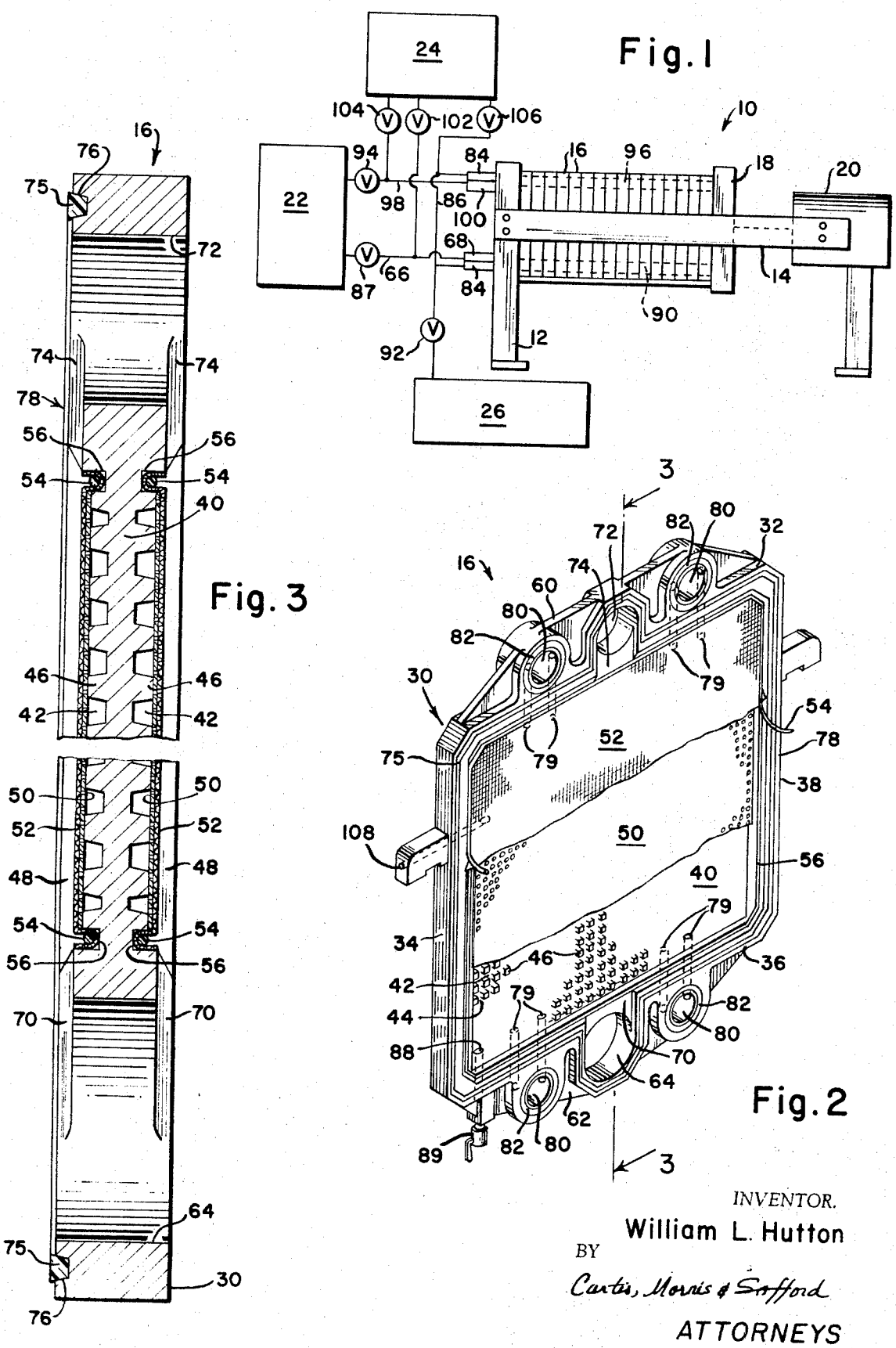

FILTER PRESS PLATE PROCESS AND APPARATUS

This invention relates generally to filter plates and filtering processes, and more particularly to filter plates for filter presses adapted to be used in a process for the pressure filtration of fluids such as sewage sludge.

Filter presses having a stack of filter plates for pressure filtration of sewage have been proposed in the past for dewatering sludge from both municipal and industrial waste waters. Such filters have been found to be desirable since a large amount of filtering area is available in a small space. This advantage, combined with high filtering pressures and simplicity of operation give the filter press a wide degree of adaptability to various types of waste material and produces a relatively large dewatered sludge cake of maximum solid content. In addition, the filter press is desirable because it is is relatively inexpensive, simple in construction, and efficient in operation.

Typically, the fluid to be filtered is a slurry which contains a mixture of solid particles suspended therein and is passed under pressure through a permeable medium, such as a cloth, within the filter press, to allow the fluid to pass through the cloth and yet retain the solids within the press.

The fluid to be filtered is chemically or thermally conditioned prior to the filtration process and is thence pumped into the filter press at pressures up to 100 to 200 psi. The conventional filter press contains a plurality of chambers formed by cloth faced filter plates which have drainage channels or recesses beneath the cloths, and these chambers are closed by a hydraulic ram which forces the plates together, sealing the plates by compressing the filter cloths about their periphery so that the fluid or filtrate cannot leave the filter except by passing through the filter cloths. Typically, this is a batch type operation, and filtration proceeds at the indicated pressures while the available space within the chambers is filled with solid matter forming filter cakes. This solid matter is held back by the filter cloths while clear filtrate is discharged from the press. The filtration process typically continues for between 1 and 2 hours until the chambers are filled or until a terminal pressure is reached.

At this point the filtration cycle is completed, the flow is stopped and the filter cakes formed within the chambers are removed from the press.

It has been found, that the rate of filtration in such a process for any fluid, depends on the pressure used to force the liquid through the filter medium, the thickness of the filter cake formed on the medium, the temperature and viscosity of the liquid being filtered, and the physical nature of the solids forming this cake.

While filter presses previously proposed for use in processes of this type have been generally satisfactory in the past, it has been found that there is a tendency for the filter plate apertures, which feed the sewage or waste fluid into the presses, to become clogged by foreign matter, particularly fibrous matter which may form clumps of felt-like impediments therein. When this occurs, excessive pressure differences tend to develop between adjacent plates within the filter press, which often result in breakage of the filter plates and thus destruction of the effectiveness of the filter press. The previously proposed filter plates for use in processes of this type, are generally provided with a single fluid influent opening, and as a result, when the influent port in one of the plates becomes clogged, a differential pressure is created within the press on either side of that plate, which, even if only a small pressure, when multiplied by the relatively large surface of the plate, creates a substantial total pressure differential which tends to break the plate. While in most municipal and industrial waste treatment plants, the sewage is prefiltered to remove large pieces of waste, there still remains a sufficient residue within the typical influent flow to cause damage to the filter press during the filtering process.

Further, the filter presses of the prior art, since they have but one influent port, take an excessively long time to fill as the air within the long empty filter must be vented through the restrictive cloths and small filtrate discharge openings which build up considerable back pressure resisting filling of the filter press. As a result, the time period for a single filtration process is considerably extended.

It has been found in the past that it is desirable to precoat filter plates with a filter aid, as for example fly ash, particularly where relatively sticky municipal and industrial waste materials are to be filtered, since the ash facilitates removal of the filter cakes from the cloths on completion of the filtration process. The problem with precoating the filter cloths of previously proposed filter plates is that many precoats, particularly fly ash precoat, are relatively heavy and settle out of the precoat liquid, and thus tend to deposit in the filter chambers nearest the inlet head. As a result, the precoat is unevenly distributed over the surface of the cloths and thus the normal benefits contemplated by the use of the filter aid are substantially decreased.

Accordingly, it is an object of the present invention to maintain an even pressure distribution within a filter press during the process of filtering fluids. It is another object of the invention to filter and dewater waste fluids and sludge in a relatively rapid and efficient process. Still another object of the invention is to filter and dewater sludge in a relatively rapid process by a compact filter press unit which is adapted to be cleaned in a relatively automatic manner. It is a still further object of the present invention to provide a relatively inexpensive and simply constructed filter plate which is adapted to be used in a filter press for pressurized filtering of waste waters and sludge. Yet another object of the invention is to provide a filter press which can be evenly precoated with ash or other precoat material.

In accordance with the process and apparatus of this invention, a filter press is provided which consists essentially of a steel framework made up of two end supports connected by a pair of parallel, horizontally extending bars or rails. On these bars are movably mounted a varying number of filter plates having cloth faced recesses which are closed tightly by a hydraulic ram that forces the plates together to form chambers therebetween. Sealing gaskets on each of the plates engage the opposed face of adjacent plates to form a fluid tight seal therebetween.

The filter plates are formed with a peripheral frame having a partition plate dividing the frame into filter cake receiving recesses on opposed sides thereof which form the chambers in which the filter cakes are formed during the filtration process. The filter cake receiving recesses are covered by a filter cloth secured in the periphery of the plate by a caulking strip pressed into the grooves on the interior periphery of the filter plate to retain the filter cloths against dislodgment. A first influent port is provided through the frames on one side of the periphery thereof, and located radially outwardly from the edge of the filter cloth, which is adapted to communicate with a corresponding influent opening on adjacent filter plates and with both sides of the recesses outwardly of the filter cloths to supply influent thereto. A second influent port is provided through the frame on the side thereof opposite the first influent port and also located radially outwardly on the edge of the filter cloth and adapted to communicate with a corresponding inlet on adjacent filter plates and with both sides of the recesses outwardly of the filter cloths. By this construction influent sewage introduced under pressure into one of the inlet ports is permitted to flow along the surface of the cloths to the other of the influent ports to provide an even distribution and circulation of influent between the adjacent filter plates. Thus, if one of the influent ports in a plate is clogged, there remains a path for circulation and distribution of liquid through that plate, by means of the other port, to the other side of the plate and the remainder of the filter plates within the press, thereby maintaining an even distribution of pressure within the filter press and on each of the filter plates. Each of the plates is further provided with an outlet passage extending through the frame for communication with corresponding outlet passages in adjacent filter plates which is in fluid communication with the recesses behind the filter cloths whereby fluid flowing through the cloths is adapted to be discharged from the filter plates.

In a filter press utilizing filter plates formed in this manner, the sludge is initially introduced to the lower influent port with the upper influent port connected back to the sludge tank, whereby as the filter fills, the liquid will flow upwardly along the surface of the filter cloths, through the upper inlet ports between the plates to evenly distribute liquid within the press and maintain an even pressure distribution therein and further, back to the sludge tank to maintain a flow through the filter press and to leave in effect, a relief opening for discharge of excess liquid during the pressure build up. Moreover, air within the filter is rapidly vented through the relatively large upper influent port during the filling process, thereby avoiding one of the deficiencies of the prior filter presses and facilitating a relatively rapid filling of the press. This and the other features of the present invention permit the filter press to perform a larger number of filtration cycles per day than is possible with previously proposed systems.

While the pressure is being built up, the filtrate discharge passages are open so that a portion of the material is filtered during the pressure increase within the press and in fact, it has been found that a major portion of the filter cake is formed during this time. After the filter press is filled and the filtering pressure begins to increase, the flow of liquid within the press is substantially reduced, and sludge may thence be introduced through the upper influent port, to enhance fluid flow and insure maintenance of an even distribution of pressure within the plates. More specifically, the upper influent port thereby insures the presence of liquid at the top of the filter plates at the desired pressure in the event that liquid from the lower port is unable to flow upwardly within the plates to the top of the plate, thus avoiding an uneven pressure distribution in the filter press in any one chamber, and on adjacent filter plates. Moreover, even if one of the ports of one of the filter plates is clogged by fibrous solid matter in the waste fluid being filtered, a flow path is provided between adjacent filter plates and throughout all of the filter plates within the press to assure that the pressure therein is evenly distributed and thereby insure the avoidance of differential pressure build ups which tend to fracture the filter plates.

Upon completion of the filtration process, the supply of sludge to the filter is shut off and the filter is drained of any effluent liquid remaining therein. The plates are then separated and the filtrate cakes, formed on the surfaces thereof, may be removed in any conventional manner, and in particular, it is foreseen that the automatic air discharge system disclosed in U.S. Pat. No. 3,347,383, the disclosure of which is incorporated herein by reference, may be conveniently utilized with the filter plates of the present invention.

In some instances it may be desirable to precoat the filter cloths of the filter plates to facilitate removal of the filter cakes therefrom, as by preventing the fibrous waste materials from sticking to the filter cloths. In such situations, a slurry of precoat material is initially supplied to the lower influent port of the filter plates and the upper influent port is connected back to the source of this slurry, whereby the precoat material is circulated through the filter as the filter press is being filled and the precoat thus is held in suspension in the slurry and evenly distributed to each chamber of the filter press. Once the filter press is filled, the filtrate discharge passages from the filter plates are opened and the return duct on the upper influent port is closed, so that the precoat slurry is filtered through the filter plate cloths whereby the precoat is evenly deposited on the cloths without excess build up in any one chamber and a clear filtrate liquid is discharged from the filter press through the discharge openings. When a predetermined period of time has elapsed, such that the desired amount of precoat has been applied to the filter cloths, the sludge desired to be filtered is introduced to the lower influent port and the top port is opened and connected to the sludge tank to permit recirculation of the liquid sludge as discussed above. The sludge is introduced into the lower port as the precoat liquid is closed off from that port, so that the pressure built up within the filter press is maintained during the transition from the precoat application process to the filtering process. Once the precoat liquid is completely shut off and a full flow of sludge is introduced into the lower influent port, the upper influent port is connected back to the sludge tank so that sludge is recirculated through the filter. When pressure builds up to a predetermined point or flow is restricted to a predetermined rate, sludge is then introduced through both the upper and lower influent ports so that the filter process continues as described above. Upon completion of the filtering process, the cakes formed in the chambers between adjacent filter plates are removed as before, and the precoat applied to the filter cloths facilitates its removal of the cakes since there is less tendency for the cakes to stick to the filter cloths.

The above, and other objects, features and advantages of this invention, will be apparent in the following detailed description of an illustrative embodiment thereof which is to be read in connection with the accompanying drawing, wherein:

FIG. 1 is a schematic illustration of a filter press in which the filter plates and filtration process of the present invention may be employed and wherein the filter press is connected to sources of precoat slurry and sludge, and to an effluent tank;

FIG. 2 is a perspective view with parts broken away of a filter plate according to an embodiment of the present invention; and FIG. 3 is a sectional view taken on line 3—3 of FIG. 2.

Referring now to the drawing, and initially to FIG. 1 thereof, it will be seen that a filter press 10 embodying the present invention includes a fixed head 12 on which are mounted supporting frames 14 which carry a series of filter plates 16 in side by side relation and which are adapted to be clamped together by means of a movable head plate 18 also carried by the frames and actuated by means of a hydraulic automatic jack 20 to maintain the plates in substantially face to face and leakproof relation. The plates can be separated either by means of an automatic plate shifting device, of which many different types are known, or they may be moved apart manually after the retraction of the movable head plate 18. As more fully described hereinafter, filter press 10 is connected to a source of sludge 22, a source of precoat slurry 24, and an effluent tank 26 in order to carry out the filtration process described above.

As seen in FIG. 2, filter plate 16 embodying the present invention and adapted to be used in filter press 10 includes a generally square or rectangular frame 30 having four relatively straight side pieces 32, 34, 36 and 38 which preferably are formed as an integral peripheral frame in a casting process. Frame 30 has a relatively substantial depth (note FIG. 3), and this frame is spanned by partition plate 40, cast integrally with the frame 30 and having a multiplicity of horizontally and vertically extending communication grooves 42, 44 on its outer face. Grooves 42 and 44 constitute a drainage area or surface for the fluid being filtered through the press and they are defined by the outwardly extending pyramids 46 on the face of partition plate 40, which as more fully described hereinafter, serve to support the filtering medium.

As partition plate 40 is substantially narrower than the peripheral frame members 32 through 38, a recess 48 is formed on either side of the plate between these frame members. When the filter plates are held in press 10 by ram 20, adjacent recesses 48 form the chambers in which the filtrate cakes are formed.

Grooves 42 and 44, and pyramids 46 are covered by perforated backing sheet 50 which is held in place on partition plate 40 at a plurality of points. Backing sheet 50 is in turn covered by a filter cloth 52 which is held in place by a caulking strip 54 formed of an elastic material inserted in a peripheral groove 56. Groove 56 may be formed either during casting of the plate or may be machined in the plate after the casting operation is completed.

Grooves 56 open outwardly of the filter plate 16, as seen most clearly in FIG. 3, and thereby hold filter cloths 52 close to the surface of the backing sheets 50. As more fully described hereinafter, the use of outwardly opening grooves 56 for caulking and holding the filtration medium 52 in place allows unobstructed feed channels for flow of waste fluid over the surface of the filter plate. In addition, frictional engagement between caulking strip 54 and the surfaces of groove 56 is sufficient to maintain cloth 52 therein during the cleaning operation so that no resetting of the filter cloths or caulking strip between the filtration runs is required. Backing sheets 50 serve to reinforce filter cloths 52, prolong their life, and aid in filter cake discharge by preventing the cloth from being forced into grooves 42 and 44 during the filtering operation.

Upper and lower sides 32 and 36 of frame 30 are each provided with extension portions 60 and 62 respectively, in which are formed a plurality of influent and effluent ducts, for distribution and circulation of the waste material introduced into the filter press and for discharge of effluent therefrom. Frame portion 62 includes a main influent opening 64 adjacent the lower edge of the partition 40 which is adapted to receive influent waste material supplied from source 22 through pipeline 66 and influent port 64, is of less width than frame portion 36 so a channel 70 is formed from the influent port 64 to the surface of filter cloths 52 and fluid flowing in the port can thereby readily flow from that port into recesses 48 and against the outer surfaces of the filter cloths 52. Since groove 56 opens outwardly of partition plate 40, and both caulking strip 54 and the periphery of filter cloth 52 are held below the plane of channel 70, an unobstructed path is provided from channel 70 to the surface of the cloth 52 whereby a uniform distribution of sludge is provided along the entire face of the cloth so that filter cakes formed in recesses 48 adjacent the face of filter cloth 52, extend from the very base of the filter cloth to its uppermost extremity. Moreover, by this construction, inlet channel 70 has a greater depth than the channels of prior filter plates, thereby lowering the possibility that the channel become clogged and increasing the rate of flow to the filter plates.

In some previously proposed filter plates the filter cloths are fixed in place by a caulking strip positioned in a peripheral groove opening inwardly of the recesses adjacent the partition plate, thereby forming a substantial outwardly extending ledge which interferes with the discharge of the filter cake on completion of the filtration process. By the construction of filter plate 16, in accordance with the present invention, such ledges are substantially eliminated and the rapid removal of the filter cake by the air process referred to above and more fully described hereinafter is substantially increased.

Extension 60 on the upper frame member 32 is provided with an influent port 72 which, in the illustrated embodiment, is of slightly smaller diameter than lower influent port 64. As partition plate 40 is of less width than frame member 32, a channel 74 is formed in the frame member from port 72 to the outer surface of filter cloths 52.

In the preferred embodiment of the present invention, it is contemplated that lower influent port 64 would have a diameter of approximately 8 inches whereas the corresponding upper influent port 72 would have a diameter of approximately 6 inches for a plate with a 54 inch square outer frame. However, while these particular dimensions have been found to be satisfactory, it is foreseen that other suitable combinations of dimensions for these influent ports may be used with similar satisfactory results.

As seen in FIGS. 2 and 3, a gasket 75 is seated within a groove 76 formed adjacent the periphery of filter plate 16. Gasket 75 extends completely about recess 48 on one side 78 of the plate and about the outer portions of ducts 64 and 72 so that, when plates 16 are held in compression against each other by jack 20, sealing gasket 75 engages the opposite surface of an adjacent plate to render the junction between the plates leakproof to prevent loss of waste water from the chambers formed by the adjacent recesses of the opposed filter plates. It will thus be apparent that when a series of plates are held in face to face relation all the inlet ports 64 and 72 of the series of plates are in alignment and in communication with each other and with the chambers formed on opposite sides of the filter plates.

To enable filtrate to be discharged from press 10, the partition plate 40 in each of the filter plates 16 is provided with a plurality of ports 79 therein opening to opposite surfaces of the partition plate to receive filtrate liquid flowing through filter cloth 52 and aperture plate 50. A pair of ports 79 is provided adjacent each corner of the filter plate, as seen in FIG. 2, and each pair communicates with an effluent port 80 formed on opposed sides of the influent ports 64 and 72. Each of the ports 80 is surrounded on side 78 of plate 16 by a sealing gasket 82 so that effluent cannot be inadvertently discharged therefrom when plates 16 are positioned against one another by jack 20.

Ports 80 are also in axial alignment and communication when the plates are held in face to face relation so that four continuous discharge passages are formed throughout the filter press which supply effluent to the effluent header pipes 84 in press head 12 which direct the effluent through pipeline 86 to tank 26. Since the filtration process of the present invention is conducted under relatively high flow rates and pressures, the effluent or filtrate material is discharged to both the top and bottom portions of the filter plates. Accordingly, a greater volume of effluent can be removed from the filter press as compared to previously proposed filter presses and therefore the time required to complete the filtration process is reduced.

Referring again to FIG. 2, it is seen that a bore or discharge passage 88 is formed adjacent one of the corners at the lower side 36 of filter plate 16, which leads to a sampling cock 89 by which the amount and character of the effluent produced within the filter plate may be periodically sampled to determine the location of plugged or torn cloths if any.

When the filter plates 16 are mounted in the press 10 and held against each other by jack 20, to form an integral filtration unit, the device is ready for operation and waste water or sludge is initially supplied (by pumps not shown) under pressure from source 22 through valve 87 and pipeline 66 to the lower influent header pipe 68 formed in head 12 which communicates with the supply channel 90 formed in the filter press by the influent ports 64 in the individual filter plates.

During this critical portion of the filtration process valve 92 on discharge pipeline 86 is opened to permit effluent filtrate to be discharged through outlet ports 80 as filter cakes build up on the faces of cloths 52. Since the rate of discharge of the effluent through ports 80 is substantially less than the rate at which waste material is supplied to channel 90, filter press 10 fills with the waste material and, since the end of channel 90 adjacent head plate 18 is closed, the flow of waste water within the press will be upwardly towards upper influent ports 72.

Since the danger of clogging in the influent ports of the filter press is greatest during the filling of the press and early stages of filtration where flow rates are high, the valve 94, which controls flow between source 22 and channel 96 formed in the filter by influent ports 72 is opened, to permit a portion of the waste water to return to source 22 through pipeline 98 which connects source 22 with header duct 100 in head 12 and with channel 96. Thus, in the event that both an upper and a lower influent port within press 10 become clogged so as to severely restrict or prevent flow therethrough, the excess waste water supplied to the press is bypassed through conduit 98 to prevent an excessive pressure build up anywhere within the filter press.

In normal operations, channels 90, 96 and influent ports 64, 72 provide free communication between adjacent chambers within the press and with the slurry tank which permits a more rapid venting and even filling of the press as compared with previously proposed filter plates having but one influent port. As waste water is supplied to the filter press those chambers between the filter plates located near the fixed head 12 tend to fill up with waste water before the others; the provision of upper influent ports 72 permits the liquid at the top of these chambers to flow therethrough to adjacent chambers within the filter press which are as yet unfilled. Circulation in this manner through the influent ports prevents clogging thereof by fibrous material within the waste water, and in the event that one of the influent ports does become clogged, an excessive pressure build up within the press is avoided since a path of circulation for the fluid remains through the other influent port so that the pressure on opposite sides of an individual plate is maintained at substantially the same level and the pressure differentials which tend to break the filter plates are avoided.

Once the filter press is completely filled, sludge or waste water from tank 22 is pumped through valve 94 into pipeline 98 and channel 96 so that a flow of waste water is maintained through the upper and lower influent ports of the filter to insure circulation of fluid in the filter press and thereby resist the formation of plugs of waste material which would clog these ports. Alternatively, it is foreseen that valve 94 may be shut, thereby preventing flow through pipeline 98 at this portion of the filtration cycle. In this situation circulation and distribution of pressure between adjacent plates is still achieved by upper channel 96 and inlet ports 72, to prevent uneven pressure distribution in the press.

As mentioned above, during the initial portion of the filtration process, when the filter press is being filled, and the pressure is building up, a substantial portion of the filtration occurs and after a higher pressure is attained and influent flow of waste water is supplied through conduit 98 the rate of filtration is somewhat decreased and the filter cakes formed within the chambers between adjacent plates have already attained a substantial size. The introduction of influent at the higher pressure through both top and bottom influent ports assures an even distribution of pressure over the filter area of the filter plates, particularly in the event that a chamber between plates is blocked so that flow from the lower influent port 64 upwardly towards the top of the filter plates is prohibited. Should this occur in a filter press having conventional filter plates, a differential pressure would be produced on the surfaces of the adjacent plates and would create severe stresses on these plates which would cause them to break. It is noted that even though the pressure differentials may be small, when this pressure is distributed over the face of a relatively large filter plate, the total differential force becomes substantial and results in substantial stresses produced against these plates. In a filter press incorporating filter plates constructed in accordance with the present invention, however, such problems are avoided.

It is often desirable particularly where relatively sticky municipal and industrial waste materials are to be filtered, to precoat the filter cloths with a filter aid, as for example, by means of ash in water before admitting the waste water to the filter press. The ash, or other precoat material, facilitates removal of the filter cake from the filter plates upon completion of the filtration process and aids in preserving the filter cloths.

When it is desired to use such a precoat system or filter aid in conjunction with the present invention, a source 24 thereof is provided in which a slurry of water and precoat aid, such as fly ash, is mixed. In this case, prior to the filtration process, the precoat aid is supplied (by a pump not shown) through a valve 102 from source 24 to lower influent header 68 of head 12 to channel 90. The valves 87 and 94 leading from source 22 of the waste water are closed at this point to prevent the comingling of sludge with the precoat mixture. A valve 104 connecting the precoat source 24 with upper influent header 100 is left open during the initial portion of the precoating process so that as the filter press 10 is filled with the precoat slurry, rapid venting of air and fast recirculation of the precoat slurry maintains the precoat aid (i.e., the ash) in suspension until the filter press is filled and the precoat is distributed evenly throughout the filter press.

During the filling process, valve 92 and valve 106 are closed so that no filtering of the slurry takes place and the slurry is merely circulated through the filter press to the chambers between the filter plates. Upon completion of the filling operation, valve 104 is closed and valve 106 is opened while the precoat slurry is continuously pumped through valve 102 into header pipe 68 and the filter press. At this time, the slurry is filtered through filter cloths 52 and the precoat, which has been held in suspension throughout the filter press, is evenly applied to the cloths as the liquid carrier of the precoat is strained through the cloths and discharged through ports 80, effluent header pipes 84, discharge pipeline 86, and valve 106. In this manner a build up of precoat in chambers adjacent the entrance influent port of the filter press, as occurs in previously proposed filter plates, is avoided and an even coating of the filter plates is assured. It is also noted that since channels 70 are immediately adjacent the plane of filter cloths 52, the cloths are coated with the filter aid even at points adjacent these channels where turbulence of influent flow is normally greatest in prior filter plates having a ledge in which the filter cloths are caulked.

Thereafter, to begin the filtering process for the waste water within tank 22, valve 87 is opened as valve 102 is closed, and valve 92 is opened as valve 106 is closed, so that the sludge is introduced into the filter press as the precoat is shut off. In this manner the pressure build up within the filter press by the precoat slurry is maintained. Valve 94 is simultaneously opened and the filtering process continues as previously described.

When the chambers between the adjacent filter plates are filled with solids and the filtration process is completed, valves 87 and 94 are shut off and plates 16 moved apart in the frame of the press so that filter cakes formed therein may be readily removed. These filter cakes may be removed manually, or preferably, an automatic system for removing the cakes, as described in the above noted Patent, may be utilized. In this case, plates 16 are provided with an inlet opening 106 which is connected through a valve (not shown) to a source of compressed air. As the plates 16 are moved apart in the frame, the valve leading to the air inlet ports 108 are selectively opened so that compressed air is introduced between the partition plate 40 and the filter cloths 52 causing the cloths to bow or flex outwardly, thereby peeling or stripping the filter cakes from the cloths. It is noted that the volume and pressure of the air supplied through port 108 is sufficient to flex the filter cloths and is not substantially effected by the air lost through passages 79. In actual practice, the cakes are peeled freely from the filter cloths with little or no breakage and with little or no residue left on the filter cloths. It is also noted that the caulking strip 54 within the outwardly opening grooves 56 firmly attaches the filter cloths to the filter plates so that the air pressure behind them will bow or flex the filter cloths but will not dislodge the edges of the cloths or the caulking from the grooves.

When the automatic air control system for removing the filter cakes from the filter plates is utilized, the use of precoat may be substantially decreased or eliminated since the air system is relatively rapid and efficient, and is capable of removing filter cakes formed from relatively sticky waste material, thereby substantially reducing the expense involved in the filtration process.

It is thus seen that a relatively simple and inexpensive apparatus is provided for filtering and dewatering waste water and sludge by a relatively rapid process, which utilizes filter plates designed to evenly distribute pressures created within the filter press during the filtration process and to prevent differential pressure build up between adjacent plates, thereby to avoid breakage of the plates during the process. In addition, it is seen that the filter plates provided for use in this process are particularly adapted for use in conjunction with a precoating aid to facilitate removal of the filter cakes from individual filter plates.

While the above embodiment of the present invention has been described in relation to a filter press particularly adapted for the filtration of sewage, it will be understood that the filter plates may be altered as the purpose demands for large or small filter presses and automatically or manually operated filter presses for a variety of types of filterable materials. Further, although a particular illustrative embodiment of the present invention has been described herein with reference to the accompanying drawing, it is to be understood that the invention is not limited to that precise embodiment, and that various changes and modifications may be effected therein by one skilled in the art without departing from the scope or spirit of this invention.

What is claimed is:

1. In a process for filtering fluids having solid substances suspended therein in a filter press having filter plates formed with vertically spaced upper and lower influent ports providing intercommunication between each of the filter chambers between said plates, the steps of, supplying liquid to be filtered to one of said ports until said press is filled with liquid, thereafter supplying liquid to be filtered to both of said ports to maintain an even pressure distribution in said press and continuously drawing effluent from said press.

2. In a process for filtering liquids having solid substances suspended therein and a filter press having filter plates formed with vertically spaced upper and lower influent ports, providing intercommunication between each of the filter chambers between said plates, the steps of, supplying liquid to be filtered to one of said ports, flowing said liquid along the surfaces of said filter plates towards the other of said ports, recirculating and distributing said liquid through said other port, until said press is filled with liquid, thereby maintaining a substantially even pressure distribution in said press and against said plates, thereafter supplying liquid to be filled into both of said ports, and continuously draining effluent from said press.

3. A process as described in claim 2 including the step of precoating said filter plates.

4. A process as defined in claim 3 wherein said precoating step includes the steps of initially circulating a slurry of precoat material through said ports in said filter plates and along the surfaces of said plates until said press is filled with said slurry, thereafter supplying said slurry through one of said ports and continuously draining filtrate from said plates thereby applying said precoat material to said filters.

5. A process as described in claim 4 wherein said step of supplying liquid to be filtered to one of said ports includes the steps of concurrently decreasing the supply of precoat slurry to said port and increasing the supply of liquid to said port until a full flow of liquid is supplied to said port whereby the pressure within said press is maintained.

6. A process as described in claim 2 wherein said step of supplying liquid to be filtered to one of said ports comprises supplying said liquid to the lower of said influent ports.

7. A filter plate for use in a filter press adapted to filter liquids having solid substances suspended therein comprising, a peripheral frame having a partition plate defining a pair of opposed drainage areas and dividing said frame into filter cake receiving recesses on opposite sides thereof, said frame having first peripheral grooves adjacent the periphery of said recesses and opening outwardly thereof, filter cloths overlying said drainage areas, means for securing the periphery of said cloths in said grooves, a first inlet port extending through said frame on one edge thereof radially outwardly of said grooves for communication with a corresponding inlet in an adjacent filter plate and communicating with both of said recesses outwardly of said filter cloths, a second inlet port extending through said frame on a side thereof opposite said one side and located radially outwardly of said grooves for communicating with a corresponding inlet in an adjacent filter plate and communicating with both of said recesses outwardly of said filter cloths whereby influent introduced into one of said inlet ports is permitted to flow along the surface of said cloths to the other of said inlet ports to provide an even distribution and circulation of influent between adjacent plates, an outlet passage adapted to communicate with corresponding outlet passages on adjacent filter plates, and at least one outlet conduit connecting said outlet passage to each side of said partition plate and in fluid communication with said recess at said drainage areas between said partition plate and said filter cloths for discharging liquid flowing through said filter cloths from said plates.

8. A filter plate as defined in claim 7 wherein said frame has a second peripheral groove on one side thereof, located radially outwardly of said first peripheral grooves and opening outwardly of said frame, and gasket means fixed in said second peripheral groove adapted to engage the peripheral frame of an adjacent filter plate to form a seal between said plates to retain liquid therebetween.

9. A filter plate as defined in claim 7 wherein said frame has feed channels formed therein for communicating said first and second ports with said recesses, said channels having a base portion lying in substantially the same plane as said filter cloths to provide an unobstructed flow path for liquid between said ports and the surface of said filter cloths.

10. A filter plate as defined in claim 8 including a pair of outlet passages located on each of said plate edges.

11. A filter plate for use in a filter press adapted to filter liquids having solid substances suspended therein comprising, a peripheral frame having a partition plate defining a pair of opposed drainage areas and dividing said frame into filter cake receiving recesses on opposite sides thereof, filter cloths overlying said drainage areas, a first inlet port extending through said frame adjacent the periphery of said recesses in liquid communication with corresponding inlets in adjacent filter plates and with said recesses outwardly of said filter cloths, a second inlet port extending through said frame on a side thereof opposite said first inlet port adjacent the periphery of said recesses in liquid communication with corresponding inlets in adjacent filter plates and with said recesses outwardly of said filter cloths whereby liquids introduced into one of said inlet ports flows along the surface of said cloths to the other of said inlet ports to provide an even distribution and circulation of influent between adjacent plates.

12. A filter plate as described in claim 10 including at least one outlet passage in said filter plate adapted to be positioned in liquid communication with similar outlet passages in adjacent filter plates, and a pair of outlet conduits associated with said passages opening at one end to their associated passage and at their opposed ends to respective sides of said partition plate whereby liquid flowing through said filter cloths and along said drainage areas is discharged from said filter plates.

13. A filter plate as defined in claim 11 wherein said frame has opposed grooves formed adjacent the periphery of said recesses and opening outwardly thereof and caulking strips engaging the periphery of said filter cloths and pressed into said grooves to secure said cloths in said grooves.

14. A filter plate for use in a filter press adapted to filter liquids having solid substances suspended therein comprising, a peripheral frame having a partition plate defining a drainage area and a filter cake receiving recess on at least one side thereof, a filter cloth overlying said drainage area, a first inlet port extending through said frame adjacent the periphery of said recess in liquid communication with said recess outwardly of said filter cloth, a second inlet port extending through said frame on a side thereof opposite said first inlet port adjacent the periphery of said recess and in liquid communication therewith outwardly of said filter cloths whereby liquid introduced into one of said inlet ports flows along the surface of said cloth to the other of said inlet ports to provide an even distribution and circulation of influent between adjacent plates.

15. A filter press adapted to filter liquids having solid substances suspended therein comprising, a frame, a fixed head plate mounted on said frame, a movable head plate slidably mounted on said frame, actuator means for moving said movable head plate with respect to said fixed head, and a plurality of filter plates movably mounted on said frame between said fixed and movable head plates and held in relatively fixed positions by said actuator means, said plates including a peripheral frame having a partition plate defining a pair of opposed drainage areas and dividing said frame into filter cake receiving recesses on opposite sides thereof, filter cloths overlying said drainage areas, a first inlet port extending through said frame adjacent the periphery of said recesses in liquid communication with corresponding inlets in adjacent filter plates and with said recesses outwardly of said filter cloths, a second inlet port extending through said frame on a side thereof opposite said first inlet port adjacent the periphery of said recesses in liquid communication with corresponding inlets in adjacent filter plates and with said recesses outwardly of said filter cloths whereby liquids introduced into one of said inlet ports flows along the surface of said cloths to the other of said inlet ports to provide an even distribution and circulation of influent between adjacent plates.

* * * * *